Patented Jan. 23, 1934

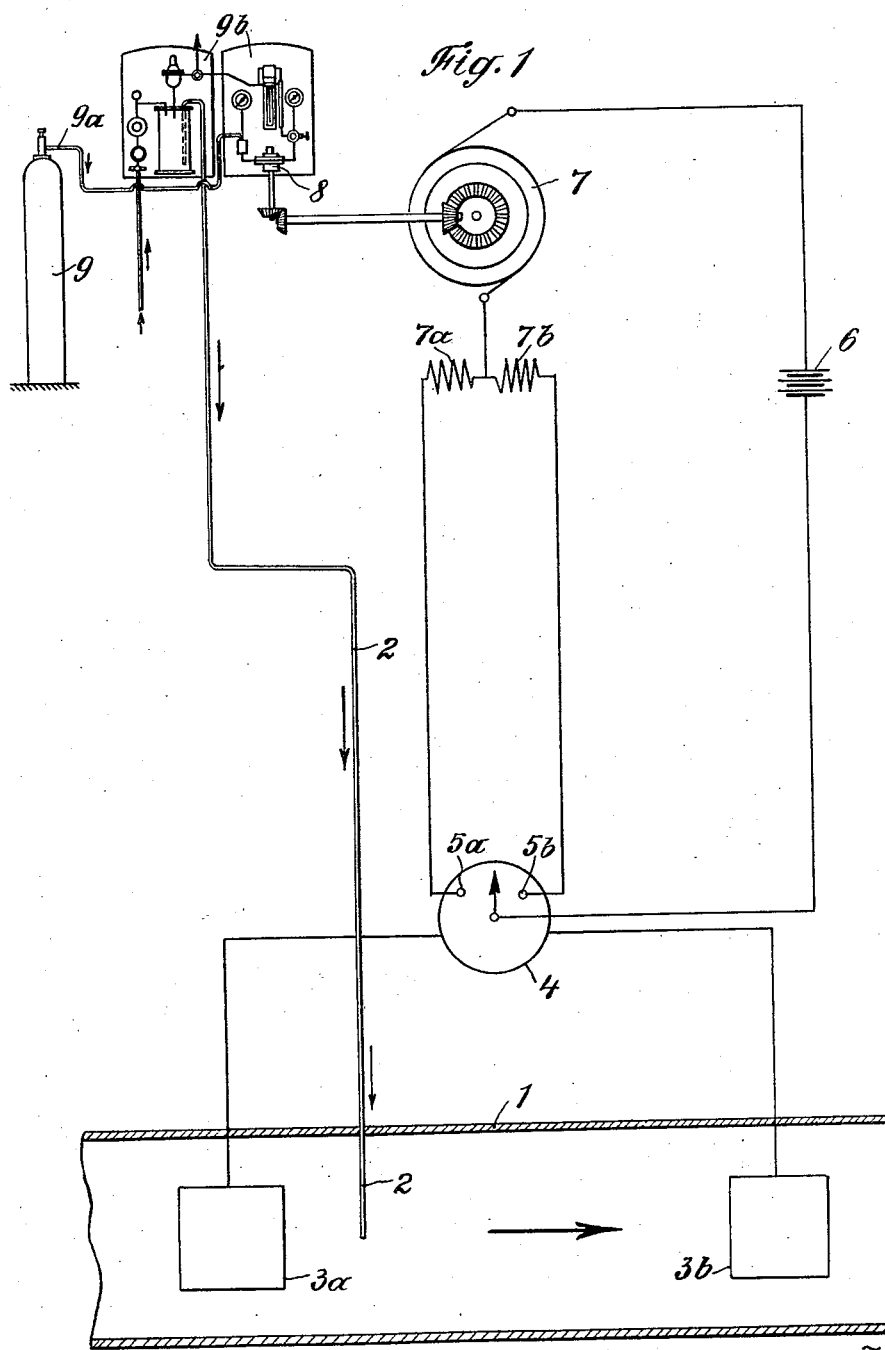

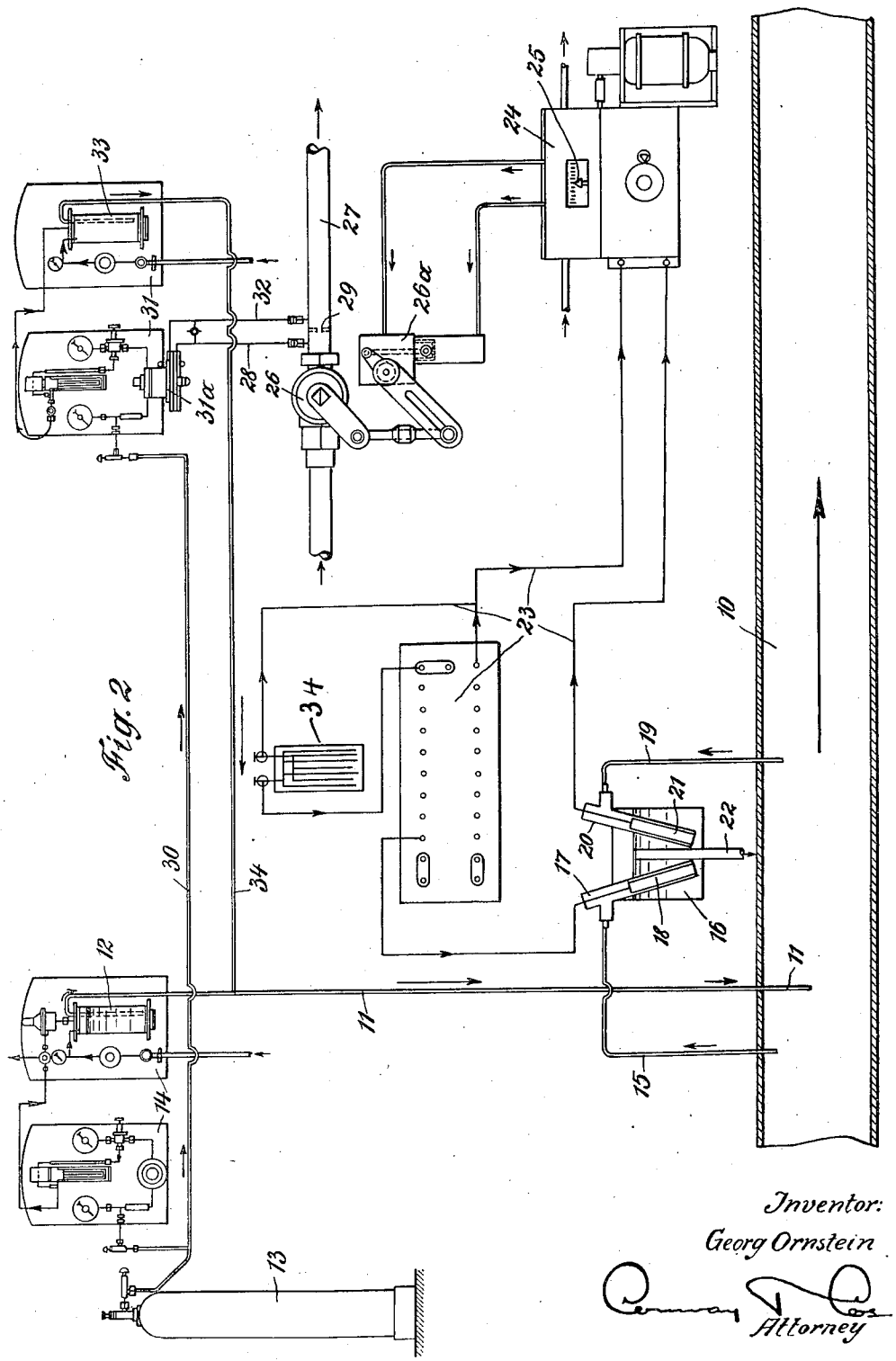

1,944,803

UNITED STATES PATENT OFFICE 1,944,803

WATER TREATMENT

Georg Ornstein, Berlin, Germany

Application October 27, 1930, Serial No. 491,585, and in Germany February 2, 1928

11 Claims. (Cl. 210—28)

This invention relates to a process for indicating and regulating the content of chlorine or similar water-purifying agents in flowing water or sewage and has for its principal object to provide for a simple and still effective method and device for the purpose in question.

A further object of the invention is to provide for an automatic regulation of the addition of chlorine or the like to water and sewage not only dependent upon the amount of liquid under treatment but also dependent upon the fluctuation of the composition of the liquid under treatment.

A further object of the invention is to provide for an automatic regulation of the addition of chlorine to water or sewage having a fluctuating absorptive power for chlorine.

According to this invention it has been found that the difference of potential produced between two electrodes, one of which is surrounded by the untreated water or sewage and the other by the treated water or sewage, is of such magnitude that it may be employed for indicating and registering the content of chlorine or the like in the water or sewage and even with advantage for operating a regulator for the addition of the water-purifying agent to the water or sewage.

The electrodes employed for carrying out the process according to this invention may consist of very varied kinds of substances. Thus, for example, electrodes of metal, for example gold, platinum, copper, silver, zinc, cobalt, aluminium and the like may be employed. The electrodes may also consist of materials, such as are usually employed for the electrodes of galvanic elements, for example, carbon, magnetite, and other well known materials commonly used for this purpose. The new process operates particularly advantageously, when the electrode surrounded by the water containing the addition of chlorine or the like, and if desired the other electrode as well, consists of a material which lies on the positive side of an electromotive series, in which hydrogen equals zero. Such substances are, for example, gold, platinum, copper and carbon. It is not necessary in this case to employ two electrodes of different material. Good results are also obtained when two electrodes of the same material, for example, gold, platinum, or copper are employed, in which case, however, it is essential that the circuit should only be closed periodically, whereas with different electrodes a permanently closed circuit may be employed.

In carrying out the process according to this invention, the electrodes may dip in the treated and untreated water at suitable places in the main water conduit. They are, therefore, disposed in the main water conduit before and after the point of introduction of the chlorine and the like. Since in this case, however, the electrodes would have to be spaced about 5 to 20 metres or more apart, it is advantageous to dispose the electrodes a small distance apart from one another in an electrolytic cell, in which the one electrode is surrounded by the treated water and the other electrode by the untreated water. Such an electrolytic cell consists, for example, of a vessel with an overflow, into which pipe lines, for example glass tubes dip, which are connected with pipe lines, which in turn connect with the main conduit in such a way that untreated water is introduced into one side of the cell and treated water into the other side. The electrodes are then disposed in these tubes so that one electrode is constantly surrounded by treated water and the other by untreated water. These two water currents then become mixed together in the cell and discharge through the overflow.

If it is desired to apply this invention not only to determining the amount of chlorine or the like contained in the water or sewage, but at the same time to automatically regulating the addition of these substances to the water or sewage in accordance with their momentary content of these substances, it is advisable to employ the galvanometer, which serves to measure the current produced between the two electrodes, for operating the regulator, which controls the delivery of the chlorine or the like. This regulator may be of various types. It may, for example, directly regulate the supply of chlorine or the like from the container, or be indirectly inserted in a conduit conveying an auxiliary water current, which serves to operate one of the usual plants for delivering dosages of chlorine or the like. The galvanometer is with advantage inserted in a compensation circuit, for example of the Wheatstone bridge type, in which the flow of current is so compensated that no current passes through that portion of the circuit, which contains the galvanometer, when both electrodes are surrounded by untreated water. Instead of inserting the galvanometer in a compensation connection with a Wheatstone bridge, a circuit from a galvanic element, which contains the same electrodes and untreated water as electrolyte, can be counter connected to the circuit containing the galvanometer.

When applying the process according to this invention to the automatic regulation of the addition of chlorine or the like to flowing water or sewage, it will, in many cases, be advisable to effect the introduction of the chlorine or the like into the water in two partial currents, of which only the one partial current, which supplies the peak requirement, is automatically regulated according to this invention, whilst the other remains constant.

The accompanying diagrammatic drawings illustrate two different modifications of an apparatus for carrying out the process according to this invention.

Figure 1 illustrates a modification in which the electrodes are disposed at suitable points in the main flow of water.

Figure 2 illustrates a modification in which the electrodes are disposed in an electrolytic cell and only the peak requirement of the chlorine added to the water or sewage is regulated according to this invention.

In the modification of the process illustrated in Figure 1, the water under treatment flows from left to right in a pipe line or conduit 1, into which the chlorine, preferably in the form of chlorine water, prepared in the usual manner in a device shown in the drawings, is introduced by way of the pipe line 2. An electrode 3a is suspended before the point of introduction of the chlorine in the water and an electrode 3b after the same, the said electrodes being connected by leads with a galvanometer 4. Contact studs 5a and 5b are disposed on both sides of the galvanometer needle. These contact studs are connected with a source of current 6, and with the windings 7a and 7b of a motor 7, in such a way that, when the galvanometer needle touches the contact stud 5a, the motor 7 rotates in one direction and when the galvanometer needle contacts with the stud 5b, in the opposite direction. This motor 7 is connected by means of a cog and wheel transmission with the spindle of a valve 8 disposed in a pipe line 9a, leading from the chlorine container 9 to the device 9b for preparing chlorine water. When the presence of too small a quantity of chlorine in the water under treatment causes the galvanometer needle to touch the contact stud 5a, the valve 8 is opened and when the presence of too great a quantity of chlorine in the water under treatment causes the galvanometer needle to touch the contact stud 5b, the valve 8 is throttled.

In the modification shown in Figure 2, the water under treatment flows in a main water conduit 10, into which chlorine water, which is produced by dissolving chlorine gas supplied from the cylinder 13 through a dosing apparatus 14, is introduced from a container 12, through the pipe line 11. A partial current of water is branched off from the main conduit 10, before the point of introduction of the chlorine water, through a pipe line 15 and introduced through a T-tube 17 containing the copper electrode into the electrolytic cell 16. Chlorine-treated water is introduced into this electrolytic cell 16 through a branch pipe 19, leading off from the main conduit 10 after the point of introduction of the chlorine, by way of the T-tube 20, in which the other electrode, made of gold, is disposed. The mixture of treated and untreated water resulting outside of the T-tubes in the cell 16 discharges through an overflow 22, for example into the main water conduit 10.

The two electrodes 18 and 21 are connected with a Wheatstone bridge circuit 23 containing a galvanometer 24. The needle 25 of the galvanometer operates a regulating piston 26a, a control valve 26, which regulates the flow of an auxiliary water current, flowing through the pipe line 27. A difference of pressure is produced by the auxiliary water current at the choking disc 29. This pressure difference actuating along the pipe lines 28 and 32 regulates the control valve 31a of a chlorine dosing plant 31. The details of this chlorine dosing plant 31, which is of the usual construction, have been omitted for the sake of simplicity.

The chlorine water solution produced in the container 33, the dosage of which depends on the position of the galvanometer needle and is controlled by the dosing apparatus 31, is introduced by way of the pipe line 34 into the pipe line 11, which also introduces the chlorine water from the container 12 into the main water conduit 10.

The cell 35 directly above the Wheatstone bridge in Fig. 2 denotes a source of current which is so positioned in the circuit that the current coming from it opposes that which flows from cell 16. When the Wheatstone bridge 23 is correctly adjusted, there is no current flowing through the galvanometer 24. If the current in the Wheatstone bridge is unbalanced, a small current flows through the galvanometer and causes it to indicate either to the right or left. The direction of indication of the galvanometer depends on whether there is too much or too little chlorine in the water. Depending on the indications of this galvanometer, an auxiliary source of water supply shown in the horizontal pipe 27 is allowed to pass through regulating piston 26a of control valve 26. It will be understood that the regulating piston controls valve 26 which controls this auxiliary water supply.

The water flowing through pipe 27 is an auxiliary current which need not remain in any fixed relationship to the current flowing through pipe 10. The auxiliary current produces merely a type of relay effect since it strengthens the small forces effecting galvanometer 25 and changes them in such fashion that they are enabled to affect the chlorine regulator 31a.

The chlorine is carried into the apparatus by the pipes entering members 14 and 31 and is supplied from chlorine container 13. The amount of gas is regulated somewhat by the high and low pressure manometer, reduction valve, and check valves, previously described.

The method of operating the plant illustrated in Figure 2 can be directly understood from the lay out of the plant. The main quantity of the chlorine necesssary for the treatment of the water is constantly introduced, whilst only the peak requirement is regulated according to the invention. Since the throw of the galvanometer needle 25 is constantly dependent on the amount of chlorine contained in the treated water, the peak of the chlorine to be added is constantly regulated according to the position of the needle, i. e. according to the voltage produced between the electrodes 18 and 21.

The needle throws of a delicate galvanometer are quite sufficient to effect the desired regulation. Voltages of the following order are, for example, produced between two electrodes:

1. If two electrodes of gold and copper are employed, the gold electrode being for immersion in the chlorinated water and the copper electrode for immersion in the non-chlorinated water, and if these two electrodes are introduced into flowing tap water a voltage of 110 millivolts is produced. When the water surrounding the gold electrode contains 0.05 mg. of free chlorine per litre, the voltage amounts to 163 millivolts. In the case of 0.06 mg. of free chlorine per litre of water, the voltage amounts to 175 millivolts, and in the case of 0.1 mg. of free chlorine per litre of water a voltage of 203 millivolts is produced.

2. If two gold electrodes are employed, these generate, when both stand in flowing tap water, a voltage of 17 millivolts. If the water, which surrounds the one electrode, contains 0.05 mg. of free chlorine per litre, the voltage amounts to 53 millivolts. In the case of 0.06 mg. of free chlorine per litre a voltage of 61 millivolts is produced, whilst 0.1 mg. of free chlorine per litre of water result in a voltage of 149 millivolts.

Similarly favorable results are obtained with other pairs of electrodes, for example platinum or gold in the chlorinated water, and silver or copper or zinc in the non-chlorinated water. Two copper electrodes may also be employed.

In the case of water or sewage, which is capable of taking up a large amount of chlorine, the pH value may fall after the chlorine treatment to such an extent that inexactitudes in the measurements of the currents produced between the electrodes may occur. In order to exclude these sources of error it has proved to be advisable to add alkalies or carbonates to the chlorinated water used for effecting the measurement or the control of the chlorine before its contact with the electrode, for example by passing the chlorinated water over calcium carbonate, and in this way neutralizing the acid water. In this case it is advisable also to treat the untreated water in a similar manner before effecting the measurement or control of the chlorine.

The invention is not limited to the measurement or control of the chlorine content of water or sewage. It may be applied in a similar manner to the treatment of water with hypochlorite or other oxidizing agents. The invention may also be applied to the softening or clarifying of water with sodium carbonate, caustic soda, phosphates, aluminium sulphate or the like. The new process is useful in all cases, in which water-soluble chemical substances are added as water-purifying agents to water or sewage and in which the said chemical substances are altered by the constituents of the water.

I claim:

1. A device for indicating and regulating the concentration of water-purifying agents in a body of liquid having a portion thereof treated with such agents, comprising an electrode immersed in an untreated portion of said liquid, a second electrode immersed in a treated portion thereof, said electrodes constituting the electropositive and electronegative poles of an electrolytic cell, the current from which varies in accordance with the concentration of water purifying agents present in the treated portion of said liquid, and means controlled by the difference of potential across said electrodes for indicating and regulating the concentration of water-purifying agents in said treated portion of said liquid.

2. A device for indicating the concentration of chlorine or similar water-purifying agents in a body of liquid constituting water or sewage having a portion thereof treated with such agents, comprising an electrode immersed in an untreated portion of said liquid, a second electrode immersed in a treated portion thereof, said electrodes constituting the electropositive and electronegative poles of an electrolytic cell, the current from which varies in accordance with the concentration of water purifying agents present in the treated portion of said liquid, and means controlled by the difference of potential across said electrodes for indicating the concentration of water-purifying agents in said treated portion of said liquids.

3. A device for regulating the concentration of chlorine or similar water-purifying agents in a body of liquid constituting water or sewage having a portion thereof treated with such agents, comprising an electrode immersed in an untreated portion of said liquid, a second electrode immersed in a treated portion thereof, said electrodes constituting the electropositive and electronegative poles of an electrolytic cell, the current from which varies in accordance with the concentration of water purifying agents present in the treated portion of said liquid, and means controlled by the difference of potential across said electrodes for regulating the addition of water-purifying agents to said liquid.

4. In an apparatus for feeding chlorine or similar water-purifying agents to a body of liquid constituting water or sewage flowing past the same, an electrode immersed in the liquid on the inlet side of said feeding apparatus so that it is to be laved by liquid free of the purifying agents, a second electrode immersed in the liquid on the discharge side of said feeding apparatus so that it is to be laved by liquid treated with purifying agents, said electrodes being maintained respectively at different electrical potentials as a result of the electrolytic action occurring in the liquids surrounding each of said electrodes, and means controlled by the difference of potential across said electrodes for regulating the supply of chlorine or similar water-purifying agents to said flowing liquid.

5. A device as claimed in claim 4 wherein there are means for indicating the difference of potential across said electrodes.

6. In an apparatus for feeding chlorine or similar water-purifying agents to a body of liquid constituting water or sewage flowing past the same, an electrode immersed in the liquid on the inlet side of said feeding apparatus so that it is laved by liquid free of the purifying agents, a second electrode in the liquid on the discharge side of said feeding apparatus thereby to be laved by liquid treated with purifying agents, said electrodes constituting the electropositive and electronegative poles of an electrolytic cell, the generated current of which varies in accordance with the quantity of water purifying agents present in the treated portion of said liquid, a galvanometer electrically connected to said electrodes responsive to the current generated by said electrolytic cell, and means controlled by the needle of said galvanometer for regulating the introduction of the purifying agent to the flowing liquid.

7. A device as claimed in claim 6 wherein the electrodes are connected to Wheatstone bridge circuit containing the galvanometer.

8. A device as claimed in claim 6 wherein the electrodes are connected to a compensation circuit of the Wheatstone bridge type, the flow of current being so compensated that no current passes through the galvanometer when both electrodes are in contact with untreated liquid.

9. In an apparatus for feeding chlorine or similar water-purifying agents to a body of liquid constituting water or sewage flowing past the same in a conduit, an electrolytic cell having a pair of electrodes mounted thereon, a pipe for supplying liquid free of purifying agents from said conduit to the electrolytic cell adjacent one of said electrodes, a second pipe for supplying treated liquid from said conduit to the electrolytic cell adjacent the other of said electrodes, and means controlled by the difference of potential between said electrodes for regulating the supply of chlorine or similar water-purifying agents to said flowing liquid.

10. In an apparatus for feeding a chlorine water-purifying agent to a body of aqueous liquid flowing in a conduit, an electrolytic cell having a pair of open ended tubes disposed therein and surrounding a pair of electrodes, means for supplying liquid free of purifying agent to one of said tubes thereby to lave one of said electrodes, means for supplying treated liquid to the other tube thereby to lave the other of said electrodes, means for conducting away the accumulation of liquid from said tubes, a galvanometer electrically connected to said electrodes, and means controlled by the galvanometer needle for regulating the supply of the purifying agent to the liquid in the conduit.

11. An apparatus for regulating the concentration of chlorine water-purifying agents in a flowing body of liquid treated with such agents, comprising an electrode laved by liquid free of the purifying agents, a second electrode laved by the liquid after treatment with the purifying agents, means for continuously feeding purifying agents to said flowing body of liquid, and supplemental means controlled by the difference of potential across said electrodes for feeding additional purifying agents to said flowing body of liquid.

GEORG ORNSTEIN.